United States Patent
Fontaine et al.

(10) Patent No.: US 10,190,203 B2
(45) Date of Patent: Jan. 29, 2019

(54) DEVICE FOR TREATING A METAL STRIP WITH A LIQUID COATING MATERIAL

(71) Applicant: Fontaine Engineering und Maschinen GmbH, Langenfeld (DE)

(72) Inventors: Pascal Fontaine, Langenfeld (DE); Dominique Fontaine, Langenfeld (DE)

(73) Assignee: Fontaine Engineering und Maschinen GmbH, Langenfeld (DE)

( * ) Notice: Subject to any disclaimer, the term of this patent is extended or adjusted under 35 U.S.C. 154(b) by 0 days.

(21) Appl. No.: 15/575,483

(22) PCT Filed: Aug. 1, 2016

(86) PCT No.: PCT/EP2016/068325
§ 371 (c)(1),
(2) Date: Nov. 20, 2017

(87) PCT Pub. No.: WO2017/036703
PCT Pub. Date: Mar. 9, 2017

(65) Prior Publication Data
US 2018/0155814 A1    Jun. 7, 2018

(30) Foreign Application Priority Data
Sep. 1, 2015 (DE) .................. 10 2015 216 721

(51) Int. Cl.
*C23C 2/20* (2006.01)
*C23C 2/24* (2006.01)
(Continued)

(52) U.S. Cl.
CPC ............ *C23C 2/20* (2013.01); *C23C 2/003* (2013.01); *C23C 2/24* (2013.01); *C23C 2/40* (2013.01);
(Continued)

(58) Field of Classification Search
CPC ....................................................... C23C 2/24
See application file for complete search history.

(56) References Cited

U.S. PATENT DOCUMENTS 3,518,109 A * 6/1970 Halley .................. C23C 2/24
                                                    118/620
3,635,748 A * 1/1972 Peoples ................ C23C 2/30
                                                    118/47
(Continued)

FOREIGN PATENT DOCUMENTS

CA      2794925 A1 *  5/2011  ............. C23C 2/003
DE    102008039244 A1    3/2009
(Continued)

OTHER PUBLICATIONS

Anonymous, PCT Third Party Observation, Jul. 6, 2017.

*Primary Examiner* — Karl Kurple
(74) *Attorney, Agent, or Firm* — Smartpat PLC

(57) ABSTRACT

A device for processing a metal strip with a liquid coating material is disclosed. Above a coating tank filled with coating material, the device has a blower having an air outlet slot for blowing liquid parts of the coating off of the metal strip. Arranged above the blower is an electromagnetic stabilizer for stabilizing the metal strip by electromagnetic forces after the exiting of the coating tank and the blower. In order to design known devices for treating a metal strip to be more favorable in respect of energy and in order to increase the accessibility for an operating person, the stabilizer is arranged above the blower in such a way that the distance d between the line of action of the maximum force of the stabilizer on the metal strip and on the air outlet gap of the blower is limited to a range of 100-1200 mm.

9 Claims, 3 Drawing Sheets

(51) Int. Cl.
*C23C 2/00* (2006.01)
*C23C 2/40* (2006.01)
*B05D 1/18* (2006.01)
*B05D 3/04* (2006.01)
*C23C 2/06* (2006.01)
*B05C 3/12* (2006.01)
*C23C 2/16* (2006.01)

(52) U.S. Cl.
CPC ............... *B05C 3/125* (2013.01); *B05D 1/18* (2013.01); *B05D 3/042* (2013.01); *C23C 2/06* (2013.01); *C23C 2/16* (2013.01)

(56) References Cited

U.S. PATENT DOCUMENTS

| | | | | |
|---|---|---|---|---|
| 3,661,116 | A * | 5/1972 | Moskowitz | B05C 3/125 118/33 |
| 4,135,006 | A * | 1/1979 | Readal | G05D 5/03 427/10 |
| 4,444,814 | A * | 4/1984 | Flinchum | C23C 2/40 118/419 |
| 4,612,215 | A * | 9/1986 | Hennechart | C23C 2/265 118/308 |
| 5,965,210 | A * | 10/1999 | Tada | C23C 2/24 118/405 |
| 8,062,711 | B2 * | 11/2011 | Lofgren | C23C 2/40 118/400 |
| 8,474,382 | B2 | 7/2013 | Bourgier et al. | |
| 2003/0077397 | A1 * | 4/2003 | Kabeya | C23C 2/003 427/431 |
| 2004/0050323 | A1 * | 3/2004 | Chae | C23C 2/14 118/400 |
| 2008/0044584 | A1 * | 2/2008 | Eriksson | C23C 2/003 427/430.1 |
| 2009/0191360 | A1 * | 7/2009 | Teramoto | C23C 2/003 427/595 |
| 2010/0209591 | A1 * | 8/2010 | Eriksson | C23C 2/003 427/8 |
| 2010/0285239 | A1 | 11/2010 | Behrens et al. | |
| 2013/0232811 | A1 * | 9/2013 | Koga | C23C 2/20 34/241 |
| 2013/0319326 | A1 * | 12/2013 | Guastini | B21B 37/007 118/620 |
| 2013/0327806 | A1 * | 12/2013 | Jang | C23C 2/003 226/196.1 |
| 2014/0211361 | A1 * | 7/2014 | Kurisu | C23C 2/24 361/157 |

FOREIGN PATENT DOCUMENTS

| | | | |
|---|---|---|---|
| DE | 102007045202 A1 | 4/2009 | |
| WO | 0111101 A1 | 2/2001 | |
| WO | 2012172648 A1 | 12/2012 | |
| WO | WO-2012172648 A1 * | 12/2012 | ............... C23C 2/14 |

* cited by examiner

DEVICE FOR TREATING A METAL STRIP WITH A LIQUID COATING MATERIAL

TECHNICAL FIELD

The invention relates to a device for treating a metal strip after this has exited a coating container with liquid coating material, for example zinc.

BACKGROUND

Devices of that kind are generally known in the prior art, for example, from WO 2012/172648 A1 and German Patent Applications DE 10 2009 051 932 A1, DE 10 2007 045 202 A1 and DE 10 2008 039 244 A1. In concrete terms, these specifications disclose a coating container filled with a liquid coating material. For coating, the metal strip is conducted through the container with the coating material. After leaving the coating container the material strip runs through a blower or a nozzle, which is arranged above the coating container, for blowing off excess parts of the still-liquid coating material adhering to the surface of the metal strip. Arranged above the blower is an electromagnetic stabilizer, which is supported by the blower and which is also called dynamic electromagnetic coating optimizer (DEMCO), for stabilizing the strip after leaving the coating container and the blower. The electromagnetic stabilizer generates electromagnetic forces, with the help of which the metal strip is kept centrally in a center plane of the overall device; oscillation of the metal strip during transit of, in particular, the blower is in this way at least reduced.

However, in these described constructions in reality there is the disadvantage—apart from in the case of the construction according to DE 10 2008 039 244 A1—that the electromagnetic stabilizer is arranged quite far above the blower. This is disadvantageous insofar as the stabilizing effect, which is exerted by the stabilizer, on the metal strip acts only to a limited extent at the blower. Moreover, the forces which are to be generated by the stabilizer and which are necessary in order to stabilize the metal strip in the region of the distant blower are comparatively large in the prior art. Accordingly, energy consumption for operating the stabilizer is also comparatively high. Finally, it is disadvantageous that the stabilizer is arranged above the nozzle support or the cross member, since as a consequence access to the metal strip in the region of the nozzle support is significantly hampered.

The invention has the object of improving a known device for treating a metal strip in such a way that access to the metal strip in the region of the nozzle support is significantly eased.

SUMMARY

This object is fulfilled by a device for treating a metal strip after it has exited a coating container filled with a liquid coating material. The device includes a blower, which is arranged above the coating container. The blower has an air outlet gap for blowing excess parts of the liquid coating material off a surface of the metal strip after passage of the metal strip through the coating container. An electromagnetic stabilizer is arranged above the blower, for stabilizing the metal strip after leaving the coating container and the blower. The electromagnetic stabilizer is so arranged above the blower that a spacing between a line of action of a maximum force of the electromagnetic stabilizer on the metal strip and the air outlet gap lies in a range of 100 to 1200 millimeters. A horizontal cross member is mounted between two vertical lateral posts. The blower is secured to and hangs below the horizontal cross member. The electromagnetic stabilizer is arranged between the horizontal cross member and the blower and is secured independently of the blower to the horizontal cross member and hangs below the horizontal cross member.

By virtue of the closer arrangement of the stabilizer to the blower it is advantageously achieved that less force has to be generated by the stabilizer in order to stabilize the metal strip in the region of the blower or nozzle. The energy requirement of the stabilizer is thereby also reduced and the device is more efficient overall.

A horizontal cross member, also called nozzle support, is mounted between two vertical posts. The blower is secured to the cross member to hang below the cross member. In addition, the stabilizer is secured below the cross member to hang thereat, but between the cross member and the blower. The mounting of the stabilizer on the cross member is independent of the attachment of the blower to the cross member.

The arrangement of not only the stabilizer, but also the blower below the cross member offers the advantage that the region above the cross member and thus also a slot, which is spanned by the cross member, for passage of the metal strip is accessible in very simple manner to an operator.

According to a first embodiment the respective individual securing of the blower and the stabilizer to the cross member takes place by way of independent displacement mechanisms. In concrete terms, the blower is secured to the cross member by way of a blower displacement mechanism, but is displaceable relative to the cross member. In addition, the stabilizer is secured to the cross member by a stabilizer displacement mechanism, but is displaceable relative to the cross member. The two displacement mechanisms enable respectively different degrees of freedom for movement of the blower and the stabilizer relative to the center plane of the device and also relative to the metal strip.

In particular, the two mechanisms enable displacement of the blower and the stabilizer relative to one another. Apart from the individual degrees of freedom, which are realized by the blower displacement mechanism and the stabilizer displacement mechanism, for the respective mechanisms it is advantageous that the cross member together with the blower and stabilizer suspended thereat is mounted on the vertical posts to be vertically movable. The vertical posts are displaceable together with the cross member parallel to one another in the horizontal plane. Because the cross member is mounted on one of the vertical posts to be pivotable in the horizontal plane about a fixed fulcrum (fixed side) and the cross member is movably mounted on the other vertical post (movable side), pivotation of the cross member in the horizontal plane is also possible. These degrees of freedom of the cross member are applicable to the blower and the stabilizer equally, since the two mentioned devices are secured to the cross member.

DETAILED DESCRIPTION

Figure 1:
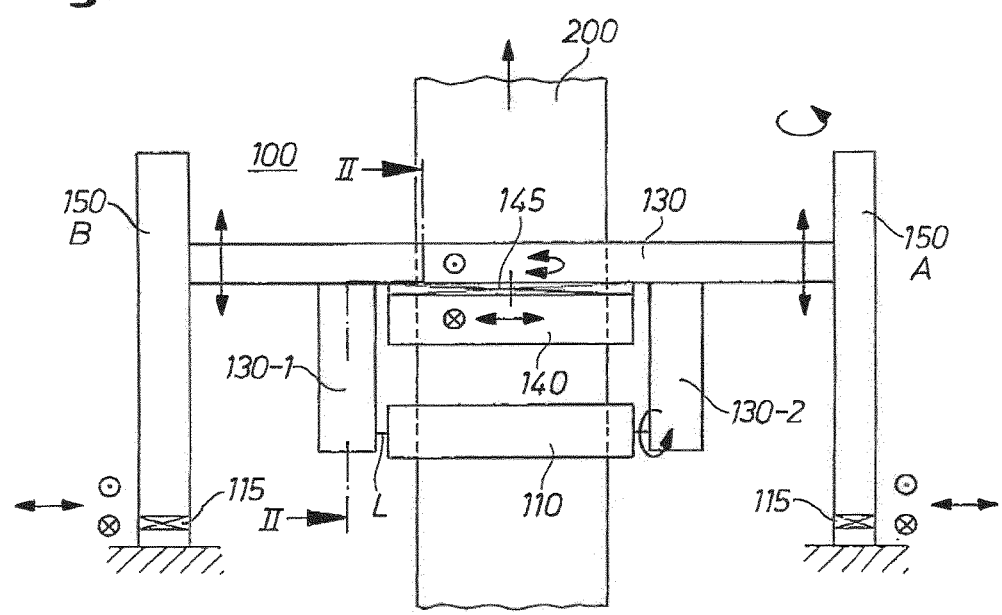
FIG. 1 shows a width view of the device according to the invention.

The invention is described in detail in the following in the form of embodiments with reference to the mentioned figures. In all figures, the same technical elements are denoted by the same reference numerals.

FIG. 1 shows the device 100 according to the invention. It comprises two lateral, vertically extending posts 150, on which a cross member 130—also termed nozzle support—is mounted to be vertically and horizontally movable; see the double arrow in FIG. 1. The device 100 is additionally pivotable in the horizontal plane. For this purpose, one of the two posts 150 is constructed as fixed side A on which the cross member is mounted to be pivotable about a vertical axis of rotation. By contrast, the opposite post is constructed as movable side B and supports the cross member merely vertically. Through this construction of the posts as fixed side and movable side the device 100 and, in particular, the cross member 140 can be oriented, in the case of a skewed metal strip 200, symmetrically relative thereto by pivotation in the horizontal. As a result, the wide sides of the cross member shall always be aligned parallel to the metal strip and the two have the same spacing therefrom.

A blower 110 or a nozzle is suspended at the cross member 130. The coupling of the blower 110 to the cross member 130 is carried out not rigidly, but by way of a blower displacement mechanism 115 configured to displace the blower 110 relative to the cross member 130 in the horizontal plane, i.e. in particular perpendicularly to the center plane 160 of the device. In addition, the blower displacement mechanism 115 is configured to pivot the blower 110 about its own longitudinal axis L and thus suitably adjust it relative to the metal strip 200.

A stabilizer 140, also termed dynamic electromagnetic coating optimizer (DEMCO), is secured by way of a stabilizer displacement mechanism 145 to the cross member between the cross member 130 and the blower 110. This stabilizer displacement mechanism 145 enables translational displacement of the stabilizer 140 in the horizontal plane relative to the cross member, in particular perpendicularly and parallel to the center plane 160 of the device 100. In addition, the stabilizer displacement mechanism 145 can also be configured to pivot the stabilizer 140 in the horizontal plane relative to the cross member 130 and relative to the blower 110 about a vertical axis of rotation.

Figure 2:
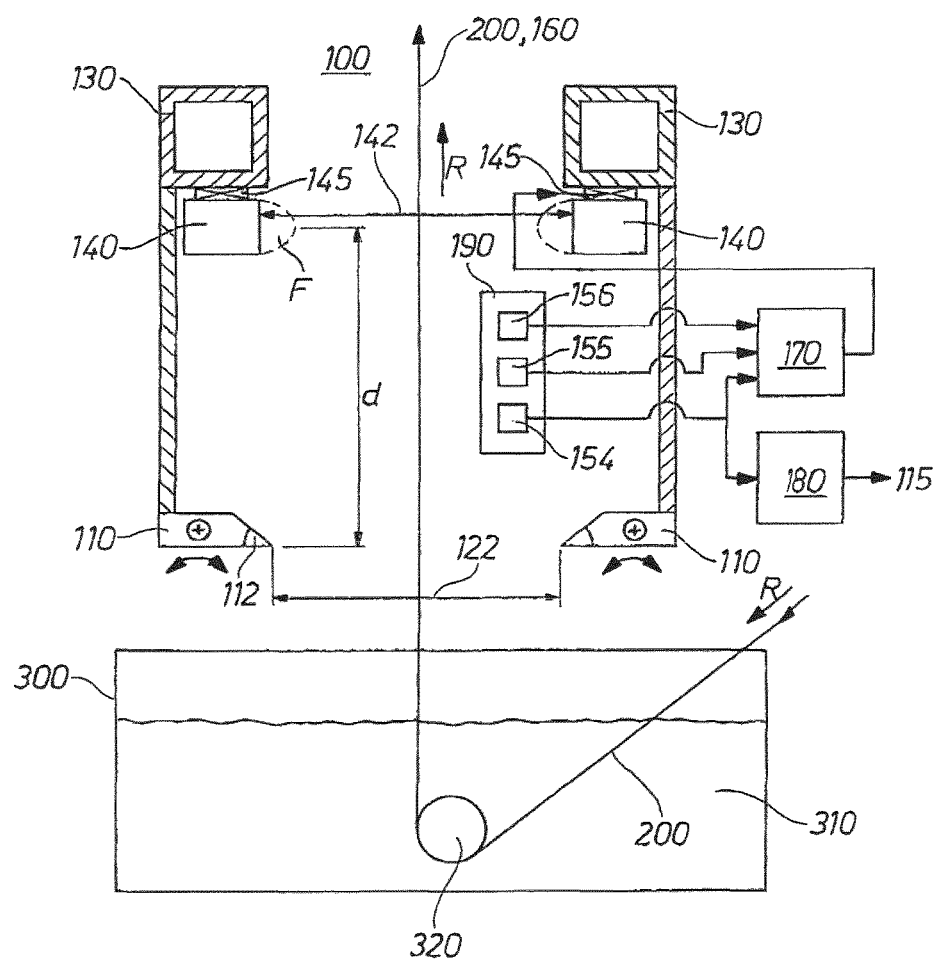
FIG. 2 shows a cross-section through the device according to the invention and FIGS. 3 and 4 show plan views of the slot of the blower according to the invention or of the electromagnetic stabilizer according to the invention, each with marking of the target centre position and different desired actual positions of the metal strip.

FIG. 2 shows the device of FIG. 1 according to the invention in a cross-sectional view. The reference numeral 170 denotes a controller for controlling the stabilizer displacement mechanism 145. A coating container 300 can be seen, which is basically arranged below the device 100. The metal strip 200 to be coated is conducted in transport direction R into the coating container 300 with the liquid coating material 310 and deflected thereat into the vertical with the help of a deflecting roller 320. It then runs from the bottom to the top initially through the blower 110 and subsequently the stabilizer 140. The present invention provides that the spacing d between the line of action of the maximum force F of the stabilizer on the metal strip 200 and the air outlet gap 112 lies in a range of 200 to 800 millimeters, preferably in a range of 300 to 500 millimeters.

For realization of the changed positioning or arrangement of the stabilizer 140 obviously all necessary electrical and pneumatic feed lines or pipe runs have to be suitably adapted. The same also applies to diverse housing panels. By comparison with the known device 100 it can be required to place the mounts 130-1, 130-2 further apart, for example by 100 millimeters, than in the prior art so as to not only be able to accommodate the stabilizer 140 in the intermediate space between the mounts, but also to make possible horizontal movability thereof with the help of the stabilizer displacement mechanism 145 or to create sufficient space for that purpose.

The blower 110 spans a slot 122 through which the metal strip 200 is guided. Excess coating material is blown off the surface of the metal strip 200 with the help of the blower.

Figure 3:
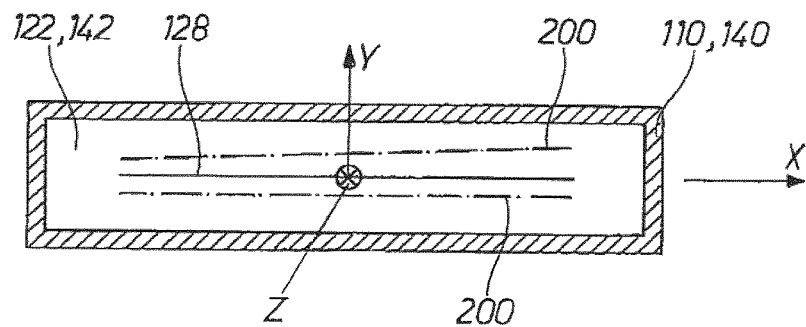

In order that the blowing-off on the upper side and lower side of the metal strip 200 takes place uniformly it is important that the metal strip 200 runs through the slot 122 of the blower 110 in a predetermined target center position, also called center plane 160, as is symbolized in FIG. 3 in the form of the solid line in X direction. This target center position is distinguished by, in particular, uniform spacings or spacing distributions from the inner edges of the slot 122 of the blower 110. Apart from the desired predetermined target center position, possible undesired actual positions of the metal strip are also illustrated in FIG. 3 as dashed lines. Thus, undesired actual positions for the metal strip 200 consist of, for example, twisting thereof relative to the target center position or a parallel shift thereof in Y direction.

Figure 4:
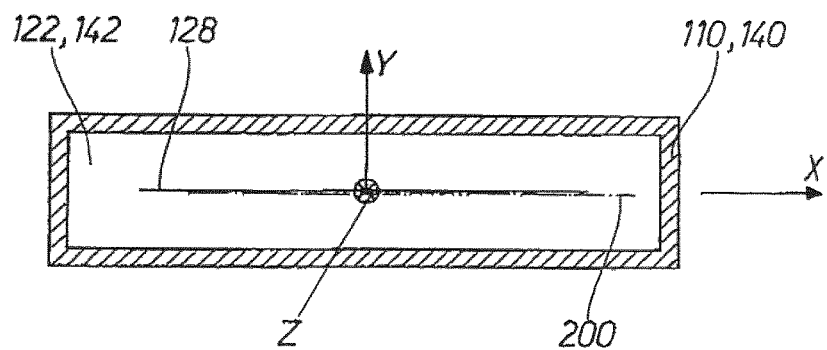

FIG. 4 shows a third possible undesired actual position in which the metal strip 200 is shifted parallelly relative to the target center position in X direction, i.e. in width direction.

The electromagnetic stabilizer 140 for its part has a slot 142 through which the metal strip 200 is similarly guided. It is also applicable here that the metal strip 200 runs through the slot 142 preferably in a predetermined target center position 160, as shown in FIGS. 3 and 4, so that the forces provided by the electromagnetic stabilizer 140 can act in desired manner uniformly on the metal strip 200 with stabilizing effect. The same applies to the slot 142 and the target center position, which is also desired there, as previously stated with reference to FIGS. 3 and 4 for the slot 122 of the blower 110.

In addition, a first detector 154 for detecting a departure of the actual position of the metal strip 200 from a predetermined target center position in the slot 122 of the blower 110 is arranged between the stabilizer 140 and the blower 110. Alternatively, the first detector 154 can also be configured for detecting the actual position of the metal strip. Moreover, a regulator 180 is provided for regulating the actual position of the metal strip 200 to the predetermined target center position 128 in the slot 122 of the blower, as explained above with reference to FIGS. 3 and 4, by displacement of the blower 110 with the help of a blower displacement mechanism 115, i.e. by displacing the cross member 130 at which the blower 110 is suspended. The regulation is carried out in response to the detected departure. If the determination of the departure of the actual position from the target center position does not take place in the first detector 154, it can also take place, for example, within the regulator 180. The displacement of the blower 110 is carried out in a horizontal plane transversely to the transport direction R of the metal strip as a function of the detected departure of the actual position of the metal strip from the predetermined target center position in the slot 122 of the blower. In other words, if it is established that the metal strip 200 does not run through the slot 122 and the target center position 128, then the blower 110 is displaced with the help of the blower displacement mechanism 115 in such a way that the metal strip again runs through the slot 122 of the blower in the predetermined target center position 128. The first detector 154 is so configured for this purpose that it can preferably detect all three actual positions of the metal strip 200 departing from the target center position 128 as described above with reference to FIGS. 3 and 4.

The displacement of the blower 110 should not have any effect on the electromagnetic stabilizer 140. For this purpose, the controller 170 is configured to control the stabilizer displacement mechanism 145 in such a way that the electromagnetic stabilizer 140 in the case of a displacement of the blower 110 relative to a pass line reference position is not moved therewith, but can remain in its original location. The pass line reference position 160 denotes a fixedly defined center plane of the device. By contrast, the target center positions 128 refer to the slots 122, 142. The controller 170 accordingly acts on the stabilizer displacement mechanism 145 in such a way that in the event of displacement of the blower 110 the electrical stabilizer 140 executes preferably precisely the opposite movement to the blower 110, i.e. as a result preferably remains at the original location thereof.

In order to realize this special form of control for the stabilizer displacement mechanism 145 the controller 170 can evaluate different situations. On the one hand, the controller 170 can be configured to carry out displacement of the electromagnetic stabilizer 140 as a function of the departure, which is detected by the first detector 154, of the actual position of the metal strip from the predetermined target center position of the metal strip in the slot 122 of the blower 110.

Alternatively or additionally, the controller 170 can be configured to carry out displacement of the electromagnetic stabilizer as a function of and in opposite direction to the displacement, which is detected by a second detector 155, of the blower 120. The second detector 155 serves for detecting the displacement of the blower 110 relative to a pass line reference position 160 of the device 100.

Finally, in accordance with a further alternative or in addition the controller 170 can be configured to effect displacement of the electromagnetic stabilizer 140 in dependence on a detected departure of the actual position of the metal strip from a predetermined target center position in the slot 142 of the electromagnetic stabilizer. A precondition thereof is that a third detector 156 is present for detecting the said departure of the actual position of the metal strip from the predetermined target center position in the slot 142 of the electromagnetic stabilizer 140.

The first, second and third detectors 154, 155, 156 are respectively configured to recognize preferably all conceivable departures of an actual position of the metal strip from the desired target center position. Amongst those are, in particular, a (parallel) displacement of the metal strip in X or Y direction or a twisting as explained above with reference to FIGS. 3 and 4. Correspondingly, the stabilizer 145 and the blower displacement mechanism 115 are, in the case of appropriate control by the regulator 180 or the controller 170, configured to move the blower 110 and the electromagnetic stabilizer 140 in desired manner in horizontal plane transversely with respect to the transport direction R of the metal strip, in particular to displace (parallelly) or rotate about a vertical axis of rotation in order to realize transit of the metal strip in the target center position.

The first and third detectors 154, 156 and optionally also the second detector 155 can be realized in the form of one or more optical sensors 190. To that extent, the sensor forms a constructional unit for the said detectors. For preference a sensor 190 is provided for each coil in the electromagnetic stabilizer 140. The measurement values of all sensors are typically averaged. The sensor 190 can also be generally termed spacing detection device.

REFERENCE NUMERAL LIST 100 device
110 blower
112 air outlet gap
115 blower displacement mechanism
122 slot of the blower
128 target centre plane
130 cross member
130-1 mount
130-2 mount
140 stabilizer
142 slot of the stabilizer
145 stabilizer displacement mechanism
150 lateral posts
154 first detector
155 second detector
156 third detector
160 pass line reference position of the device
170 controller
180 regulator
190 sensor
200 metal strip
310 coating material
A fixed side
B movable side
d spacing
F force
L longitudinal axis of blower
R transport direction of the metal strip
X width direction of the metal strip in target center position
Y direction transverse to the plane spanned by the metal strip

The invention claimed is:

1. A device for treating a metal strip after the metal strip has exited a costing container filled with a liquid coating material, comprising
   a blower, which is arranged above the coating container, with an air outlet gap for blowing excess parts of the liquid coating material off a vertically moving surface of the metal strip after passage of the metal strip through the coating container;
   an electromagnetic stabilizer, which is arranged above the blower, for stabilizing the metal strip after leaving the coating container and the blower, wherein the electromagnetic stabilizer is so arranged above the blower that a spacing between a line of action of a maximum force of the electromagnetic stabilizer on the metal strip and the air outlet gap lies in a range of 100 to 1200 millimeters; and
   a horizontal cross member mounted between and attached to two vertical posts,
      wherein the blower is secured to and hangs below the horizontal cross member, and
      wherein the electromagnetic stabilizer is arranged between the horizontal cross member and the blower, and
      wherein the electromagnetic stabilizer and the blower are independently secured to the horizontal cross member, and
      wherein the electromagnetic stabilizer hangs below the horizontal cross member.

2. The device according to claim 1, wherein
the blower is secured by a blower displacement mechanism to the horizontal cross member, the blower displacement mechanism being configured to displace the blower in a horizontal plane relative to the horizontal cross member and/or to pivot the blower about its longitudinal axis; and
wherein a regulator is provided for activating the blower displacement mechanism.

3. The device according to claim 1,
wherein the electromagnetic stabilizer is secured to the horizontal cross member by a stabilizer displacement mechanism, the stabilizer displacement mechanism being configured to translationally displace and/or pivot the electromagnetic stabilizer relative to the horizontal cross member and relative to the blower in a horizontal plane; and
wherein a controller is provided for controlling the stabilizer displacement mechanism.

4. The device according to claim 1, wherein the horizontal cross member and, together with the horizontal cross member also the blower and the electromagnetic stabilizer secured thereto, are mounted at the vertical posts to be vertically displaceable.

5. The device according to claim 2,
wherein a first detector is provided for detecting a departure of the actual position of the metal strip from a predetermined target center position in a slot of the blower, and
wherein the regulator is configured to regulate the actual position of the metal strip to the predetermined target center position of the metal strip in the slot of the blower by displacing the blower with help of the blower displacement mechanism in the horizontal plane in dependence on the detected departure of the actual position of the metal strip from the predetermined target center position in the slot of the blower.

6. The device according to claim 5,
wherein the electromagnetic stabilizer is secured to the horizontal cross member by a stabilizer displacement mechanism, the stabilizer displacement mechanism being configured to translationally displace and/or pivot the electromagnetic stabilizer relative to the horizontal cross member and relative to the blower in a horizontal plane, and
wherein a controller is provided for controlling the stabilizer displacement mechanism, and wherein the controller is configured to displace the electromagnetic stabilizer in dependence on the departure, which is detected by the first detector, of the actual position of the metal strip from the predetermined target center position of the metal strip in the slot of the blower.

7. The device according to claim 3,
wherein a second detector is provided for detecting the displacement of the blower relative to a pass line reference position of the device; and
wherein the controller is configured to control the stabilizer displacement mechanism for displacing the electromagnetic stabilizer in dependence on and in opposite direction to the displacement, which is detected by the second detector, of the blower.

8. The device according to claim 3,
wherein a third detector is provided for detecting a departure of the actual position of the metal strip from a predetermined target center position in a slot of the electromagnetic stabilizer; and
wherein the controller is configured to control the stabilizer displacement mechanism to displace the electromagnetic stabilizer in dependence on a detected departure of the actual position of the metal strip from the predetermined target center position in the slot of the electromagnetic stabilizer.

9. The device according to claim 3,
wherein the stabilizer displacement mechanism for displacing the electromagnetic stabilizer is arranged between the horizontal cross member and the electromagnetic stabilizer.

* * * * *

UNITED STATES PATENT AND TRADEMARK OFFICE
CERTIFICATE OF CORRECTION

PATENT NO. : 10,190,203 B2
APPLICATION NO. : 15/575483
DATED : January 29, 2019
INVENTOR(S) : Fontaine et al.

Page 1 of 1

It is certified that error appears in the above-identified patent and that said Letters Patent is hereby corrected as shown below:

In the Claims

Claim 1, Column 6, Line 41:
Replace "costing container" with --coating container--

Signed and Sealed this
Nineteenth Day of March, 2019

Andrei Iancu
*Director of the United States Patent and Trademark Office*